Figures 1, 2:
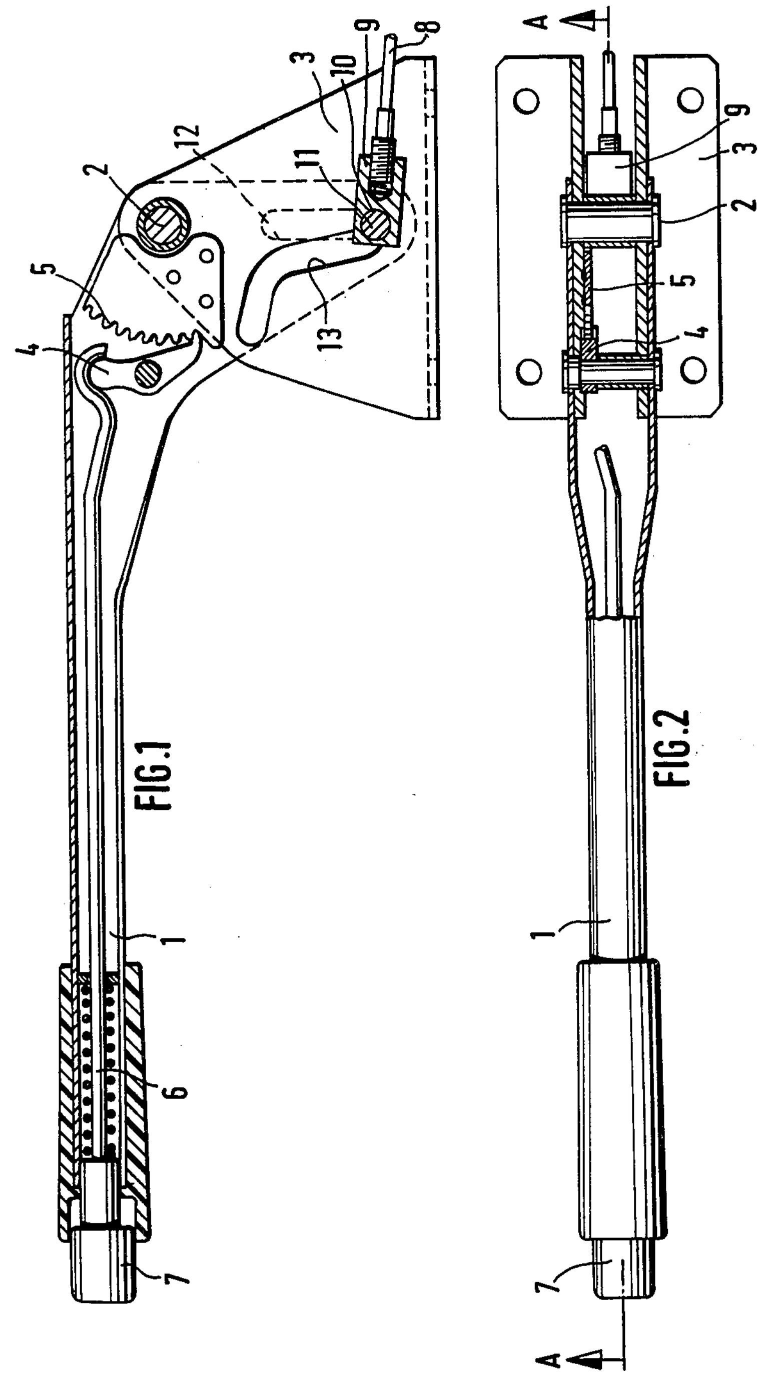

United States Patent [19]

Petrzelka

[11] 4,075,907

[45] Feb. 28, 1978

[54] VARIABLE TRANSMISSION RATIO BRAKE ACTUATING DEVICE

[75] Inventor: Miloslav Petrzelka, Troisdorf, Altenrath, Germany

[73] Assignee: Uni-Cardan AG, Lohmar, Germany

[21] Appl. No.: 742,747

[22] Filed: Nov. 18, 1976

[30] Foreign Application Priority Data

Nov. 27, 1975 Germany ............................ 2553228

[51] Int. Cl.$^{2}$ ............................................... G05G 1/04

[52] U.S. Cl. ...................................................... 74/523

[58] Field of Search .......................... 74/523, 526, 469

[56] References Cited

U.S. PATENT DOCUMENTS 1,672,220 6/1928 Hughes ............................. 74/523 X 3,587,340 6/1971 Grosseau ............................... 74/469

4,030,378 6/1977 Kroesser ............................... 74/469

*Primary Examiner*—Leonard H. Gerin

*Attorney, Agent, or Firm*—Edmund M. Jaskiewicz

[57] ABSTRACT

A variable transmission ratio brake actuating device comprises a brake lever pivotally mounted on a frame. The frame and brake lever are each provided with a guide slot or groove which extend toward the pivot mount and intersect each other. A connector link to transmit force to a brake is always positioned at the point of intersection of the brake lever and frame guides. Pivoting of the brake lever guides the link at a distance relative to the pivot mount which decreases from the release position toward the braking position.

3 Claims, 2 Drawing Figures

A
1
2
3
4
5
6
7
8
9
10
11
12
13

VARIABLE TRANSMISSION RATIO BRAKE ACTUATING DEVICE

The present invention relates to a variable transmission ratio brake actuating device, more particularly, to the guiding of the link to transmit force to a brake during pivoting of the brake lever.

One form of a brake actuating device which operates at a variable transmission ratio may comprise a ratchet lever or pawl which guides an element to transmit force to a brake when the lever is pivoted. The force transmitting element is connected with the brake in such a manner that the distance of the element from the braking lever pivot axis decreases as the brake lever is pivoted from the brake release to the braking position.

Known forms of such brake actuating devices have the disadvantage that the brake lever must be provided with an additional tension lever in order to accommodate a tension cable which applies a tension force to the brake. In addition, guide surfaces must be provided for the control lever since otherwise this control lever may tilt and thus impair accurate and proper functioning of the brake actuating device. As a result, the transmission element consists of a pair of cables each of which is connected with a wheel brake since it is impossible to prevent tilting of the control lever when only a single cable is used.

Another disadvantage is that the actual braking forces which are applied to the brakes may be of relatively different values because of different degrees of friction wear on the brake linings and the brake drums or brake discs, or because of different degrees of elongation in the respective brake cables. In addition, brake clearance or play must be adjusted precisely and individually for each brake.

It is therefore the principal object of the present invention to provide an improved and simplified structure for guiding the element which transmits force to the brake while maintaining a variable transmission ratio in a brake actuating device.

The present invention essentially provides that the brake lever and its supporting frame each has a guideway extending toward the brake lever pivot and a connector link to transmit force to the brake is received in the guideway. The guideways in the brake lever and frame will always mutually intersect and the connector link is maintained at the point of intersection of the guideways during pivoting of the brake lever.

According to one aspect of the present invention a variable ratio brake actuating device may comprise a brake lever pivotally mounted on a frame and first and second guide means on the frame and brake lever respectively extending toward the pivot mount and intersecting each other throughout pivoting of the brake lever. A connector link to transmit force to a brake is always positioned at the point of intersection of the first and second guide means. Pivoting of the brake lever guides the link at the distance relative to the pivot mount which decreases from the release position toward the braking position.

Other objects and advantages of the present invention will be apparent upon reference to the accompanying description when taken in conjunction with the following drawings, which are exemplary, wherein:

FIG. 1 is an elevational view in section taken along the line A—A of FIG. 2 and illustrating the brake actuating device according to the present invention; and FIG. 2 is a top plan view of the brake actuating device of FIG. 1.

Proceeding next to the drawings wherein like reference symbols indicate the same parts throughout the various views a specific embodiment and modifications of the present invention will be described in detail.

The variable transmission ratio brake actuating device according to the present invention is shown in FIGS. 1 and 2 and comprises a brake lever 1 which is a manual or handbrake lever pivotally mounted on a pin or shaft 2 extending between spaced side walls of a supporting frame 3. The brake lever 1 can be fixed in position with respect to the frame 3 by a resiliently supported locking pawl 4 engageable with an arcuate ratchet bar 5 which is rigidly connected to the frame 3. The pawl 4 can be disengaged to permit pivoting of the lever 1 by depressing a push button 7 in opposition to a compression spring 6 located in the handle of the brake lever. The push button 6 is connected by means of a rod to one arm of the pivotally mounted pawl 4 as shown in FIG. 1.

The brake lever 1 is connected to the brakes by a tension cable 8 by means of which force is transmitted to the brakes. The cable 8 is threadedly attached to a connector link 9 provided with a transverse bore 10 which receives a guide pin 11. The pin 11 is slideably received in guide slots 12 and 13 formed in the brake lever 1 and frame 3 respectively so that the pin 11 is positively guided in the slots. As may be seen in FIG. 1, the slots 12 and 13 extend substantially to the pivot mount 2 when the brake lever 1 is in the release position as shown in FIG. 1. The brake lever slot 12 extends substantially radially toward the pivot mount 2. The frame slot 13 initially extends at a constant distance from the pivot axis 2 and then at a decreasing distance and subsequently at a substantially constant distance with respect to the pivot axis 2. At the constant distances, the respective portions of the slot 13 are substantially tangential to the pivot axis 2.

Thus, in the release position, the cable 8 is positioned at a relatively great distance from the pivot axis 2 of the brake lever 1. As a result, the ratio of the pivotal travel in an arcuate direction of the handle of the brake lever 1 and the distance traveled by the cable 8 is relatively small in the release position and during the initial stage of pivoting the brake lever from the release position. As the brake lever is pivoted in the clockwise direction toward the braking position, the cable 8 will approach the pivot axis 2. This decrease of the distance between the cable 8 and the pivot axis 2 will increase the ratio of the pivotal travel at the handle of the lever 1 to the distance traveled by the cable 8. Accordingly, the transmission ratio is greater.

As the brake lever 1 is pivoted clockwise about its pivot axis 2, the connector link 9 is also pivoted because of its guide pin 11 which is positively guided in the neutrally intersecting guide slots 12 and 13. The pin 11 will always be positioned at the point of intersection of the guide slots 12 and 13 throughout the pivoting of the brake lever.

Because of the low transmission ratio during the early stages of moving the brake lever to the braking position, the movement of the cable 8 will be accelerated and the cable 8 will quickly travel the distance required to overcome any play in the brakes and only a small pivotal movement of the brake lever will be necessary to overcome this play or clearance. Since the cable 8 is not required to produce any significant forces during the early stage of moving the brake lever from the release position, no significant actuating force is required and the low transmission ratio is satisfactory. As the brake lever 1 continues its pivoting movement, there will be a change in the pitch of the slot 13 in the frame 3 and in this second phase the connector link 9 will be guided radially into the vicinity of the pivot axis 2 by the guide pin 11 engaged in the elongated slot 12. This will increase the transmission ratio and the ratio will remain substantially constant during the last phases of moving the brake lever to the braking position. The brake lever 1 has thus reached its maximum mechanical efficiency at that time when the cable 8 is subjected to more substantial operative forces.

While the brake lever 1 has been disclosed as being manually operated, it is to be noted that other forms of a lever may be utilized such as a two-armed lever or an angle lever. In addition, a thrust rod may be used to transmit force to the brake instead of the tension cable 8 as disclosed above.

Instead of the pin 11, needle bearings may be utilized to guide the connector link 9 and the sliding friction will be converted into rolling friction which would improve the overall efficiency of the brake actuating device.

The slots 12 and 13 may be constructed as other forms of guideways including grooves.

An advantage of the present invention is that the tension cable is connected to the guideways of the frame and brake lever by a connector link without requiring additional special direction control lever elements. In addition, reliable braking action is provided by a single tension cable which may pass over a reversing pulley. This structure simplifies any subsequent adjustment of the brakes and assures that equal braking forces will be applied to each of the wheels even should relatively different brake clearances exist.

It will be understood that this invention is susceptible to modification in order to adapt it to different usages and conditions, and accordingly, it is desired to comprehend such modifications within this invention as may fall within the scope of appended claims.

What is claimed is:

1. A variable ratio brake actuating device comprising a frame, a brake lever pivotally mounted on said frame, first and second guide means on said frame and brake lever respectively extending toward the pivot mount and intersecting each other throughout pivoting of the brake lever, and a connector link to transmit force to a brake always positioned at the point of intersection of said first and second guide means, pivoting of said brake lever guiding said link at a distance relative to the pivot mount which decreases from the release position toward the braking position.

2. A variable ratio brake actuating device as claimed in claim 1 wherein said first and second guide means each comprises one of grooves or elongated slots.

3. A variable ratio brake actuating device as claimed in claim 1 wherein said second guide means extends radially from the brake release position toward the pivot mount, said first guide means extending initially at a constant distance, then at a decreasing distance and subsequently at a substantially constant distance relative to the pivot mount.

* * * * *